(12) United States Patent
Nakamura

(10) Patent No.: US 9,185,254 B2
(45) Date of Patent: Nov. 10, 2015

(54) PRINTER AND PRINTING METHOD

(71) Applicant: Roland DG Corporation, Hamamatsu-shi, Shizuoka (JP)

(72) Inventor: Yasutoshi Nakamura, Hamamatsu (JP)

(73) Assignee: Roland DG Corporation, Shizuoka (JP)

( * ) Notice: Subject to any disclaimer, the term of this patent is extended or adjusted under 35 U.S.C. 154(b) by 0 days.

(21) Appl. No.: 14/274,945

(22) Filed: May 12, 2014

(65) Prior Publication Data
US 2014/0333946 A1 Nov. 13, 2014

(30) Foreign Application Priority Data
May 13, 2013 (JP) ................................. 2013-100930

(51) Int. Cl.
| B41J 29/393 | (2006.01) |
| H04N 1/00 | (2006.01) |
| B41J 3/28 | (2006.01) |
| G01B 11/25 | (2006.01) |
| B41J 11/00 | (2006.01) |

(52) U.S. Cl.
CPC ............... *H04N 1/00737* (2013.01); *B41J 3/28* (2013.01); *B41J 11/008* (2013.01); *G01B 11/25* (2013.01)

(58) Field of Classification Search
CPC ............................ B41J 11/008; B41J 11/0095
USPC .......................................................... 347/19
See application file for complete search history.

(56) References Cited

U.S. PATENT DOCUMENTS

| 2007/0070099 A1 | 3/2007 | Beer et al. |
| 2009/0120249 A1 | 5/2009 | Gauss et al. |
| 2012/0256995 A1 | 10/2012 | Holzer et al. |

FOREIGN PATENT DOCUMENTS

| JP | 2007-136764 A | 6/2007 |
| JP | 2007-309660 A | 11/2007 |

OTHER PUBLICATIONS

Official Communication issued in corresponding European Patent Application 14168091.8, mailed on Oct. 9, 2014.

*Primary Examiner* — Stephen Meier
*Assistant Examiner* — Alexander D Shenderov
(74) *Attorney, Agent, or Firm* — Keating & Bennett, LLP

(57) ABSTRACT

A flatbed type printer includes a table on or over which a print medium including a flat print surface is placed, a print head, a projecting unit configured to project a Gray code pattern on the table, an image taking unit configured to take an image of the projected Gray code pattern, a generating unit configured to generate a first spatial code image using an image taken with no print medium placed and to generate a second spatial code image using an image taken with the print medium placed, a generating unit configured to generate an image of the print surface using the first and second spatial code images, a normalizing unit configured to normalize the print surface in the image of the print surface, and a converting unit configured to convert print data edited on the normalized print surface into data printable on the pre-normalization print surface.

11 Claims, 12 Drawing Sheets

THE NUMBER OF PIXELS IN THIS IMAGE CORRESPONDS TO PRINTER RESOLUTION

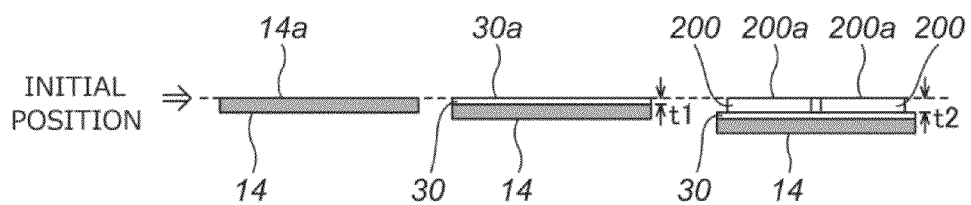
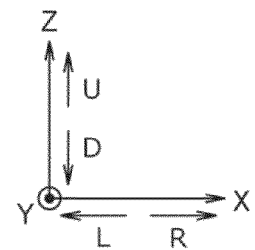
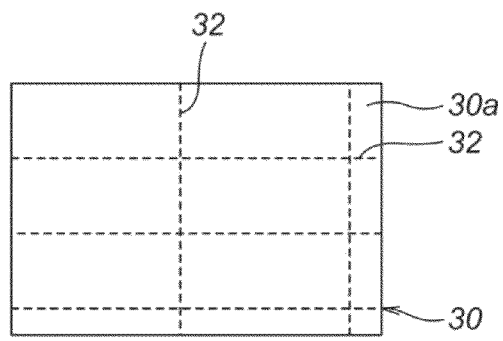
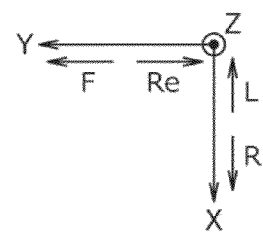

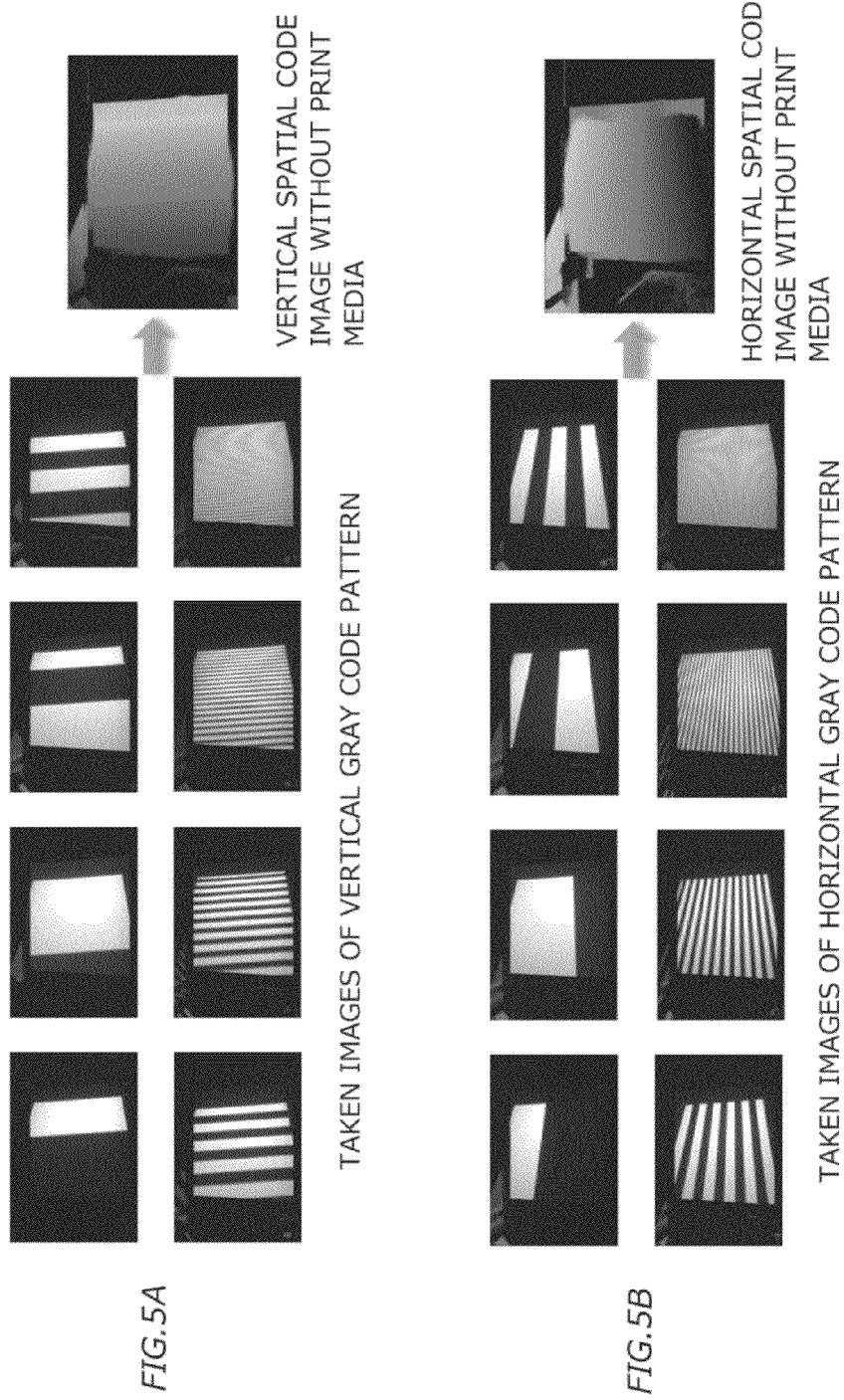

PRINTER AND PRINTING METHOD

BACKGROUND OF THE INVENTION

1. Field of the Invention

The present invention relates to printers and printing methods. More specifically, the present invention relates to printers and printing methods for performing desired printing on print surfaces of three-dimensional print media.

2. Description of the Related Art

As a printer for performing printing on a print surface of a print medium, a "flatbed type" printer is conventionally known. A flatbed type printer includes: a table on which a print medium is placed; and a print head. All operations of the flatbed type printer are controlled by a microcomputer, so that the print head is displaced in two directions perpendicular to each other within the same plane, thus performing printing on the print medium placed on the table. Such a flatbed type printer is normally used to perform printing on a three-dimensional print medium having a flat print surface.

When printing is performed on a three-dimensional print medium using such a flatbed type printer, the three-dimensional print medium is placed at a given position on the table, and then printing is performed on the print surface of the print medium based on print data.

In order to perform print printing at a given position on the print surface of the print medium, the print medium must be precisely placed at a predetermined position on the table. Therefore, the position at which the print medium is to be placed has to be precisely decided by, for example, measuring dimensions of the print medium in advance. As a result, the number of operational steps for performing printing on the print surface of the print medium is undesirably increased, which increases a burden on a worker.

As a solution to such a problem, a technique disclosed in JP 2007-136764 A, for example, is proposed. Specifically, JP 2007-136764 A discloses a technique for using a jig capable of holding a plurality of three-dimensional print media. The jig is fixable to a table. When printing is performed on the print media, a plurality of the print media are held by the jig, and the jig that holds the print media is fixed to the table. Note that a position at which each print medium is held by the jig is decided in advance. This position is input in advance to a microcomputer that controls a printer. The technique disclosed in JP 2007-136764 A is intended to position each three-dimensional print medium by the jig so as to perform printing at a given position on a print surface of the print medium.

However, the technique disclosed in JP 2007-136764 A makes it necessary to fabricate the jig in accordance with shapes and sizes of the print media, which means that the fabrication of the jig requires much time and trouble. Moreover, when the print media are produced in low quantities, this technique brings about an increase in cost.

SUMMARY OF THE INVENTION

Accordingly, preferred embodiments of the present invention provide a printer and a printing method which are capable of performing printing at a desired position on a print surface of a print medium without increasing a burden on a worker and without using a jig that holds the print medium.

A printer according to a preferred embodiment of the present invention is a flatbed type printer for performing predetermined printing based on print data. The printer includes a table that includes an upper surface on or over which a print medium including a flat print surface is to be placed, and that is movable at least in a Z-axis direction of an XYZ rectangular coordinate system which includes a Y-axis direction and the Z-axis direction; a print head disposed above the table and movable at least in an X-axis direction of the XYZ rectangular coordinate system which includes the X-axis direction and the Y-axis direction; a projecting unit configured to project a Gray code pattern on the table; an image taking unit configured to take an image of the Gray code pattern projected on the table by the projecting unit; a generating unit configured to generate a first spatial code image based on the image of the Gray code pattern taken by the image taking unit while the Gray code pattern is projected from the projecting unit, with the print medium not placed on or over the table whose upper surface is located at a given position in the Z-axis direction, and configured to generate a second spatial code image based on the image of the Gray code pattern taken by the image taking unit while the Gray code pattern is projected from the projecting unit, with the print medium placed on or over the table so that the print surface of the print medium is located at the given position; an image generating unit configured to generate an image of the print surface of the print medium by determining a difference between the first and second spatial code images; a normalizing unit configured to change an orientation the print surface to a given orientation in the image of the print surface of the print medium; and a converting unit configured to convert print data edited on the changed print surface into data printable on the pre-change print surface.

According to one preferred embodiment of the present invention, the table is preferably movable in the Y-axis direction and the Z-axis direction, and the print head is preferably movable in the X-axis direction.

According to one preferred embodiment of the present invention, the table is preferably movable in the Z-axis direction, and the print head is preferably movable in the X-axis direction and the Y-axis direction.

According to one preferred embodiment of the present invention, the normalizing unit is preferably configured to set a quadrilateral to an outline of the print surface and to calculate an orientation of the print surface so as to allow the print surface to assume the given orientation.

According to one preferred embodiment of the present invention, the projecting unit is preferably configured to project an 8-bit Gray code pattern.

According to one preferred embodiment of the present invention, the print head preferably is an inkjet head from which ink is ejected by an inkjet method.

A printing method according to yet another preferred embodiment of the present invention is a printing method for a flatbed type printer for performing predetermined printing based on print data, the printer including a table that includes an upper surface on or over which a print medium including a flat print surface is to be placed, and that is movable at least in a Z-axis direction of an XYZ rectangular coordinate system which includes a Y-axis direction and the Z-axis direction; a print head disposed above the table and movable at least in an X-axis direction of the XYZ rectangular coordinate system which includes the X-axis direction and the Y-axis direction; a projecting unit configured to project a Gray code pattern on the table; and an image taking unit configured to take an image of the Gray code pattern projected on the table by the projecting unit. The printing method includes steps of generating a first spatial code image using the image of the Gray code pattern taken by the image taking unit while the Gray code pattern is projected from the projecting unit, with the print medium not placed on or over the table whose upper surface is located at a given position in the Z-axis direction;

generating a second spatial code image using the image of the Gray code pattern taken by the image taking unit while the Gray code pattern is projected from the projecting unit, with the print medium placed on or over the table so that the print surface of the print medium is located at the given position; generating an image of the print surface of the print medium based on the first and second spatial code images; changing an orientation of the print surface to a given orientation in the image of the print surface of the print medium; and converting print data edited on the changed print surface into data printable on the pre-change print surface.

According to one preferred embodiment of the present invention, the table is preferably movable in the Y-axis direction and the Z-axis direction, and the print head is preferably movable in the X-axis direction.

According to one preferred embodiment of the present invention, the table is preferably movable in the Z-axis direction, and the print head is preferably movable in the X-axis direction and the Y-axis direction.

According to one preferred embodiment of the present invention, the normalizing unit is preferably configured to set a quadrilateral to an outline of the print surface and to calculate an orientation of the print surface so as to allow the print surface to assume the given orientation.

According to one preferred embodiment of the present invention, the projecting unit is preferably configured to project an 8-bit Gray code pattern.

Various preferred embodiments of the present invention provide a printer and a printing method which are capable of performing printing at a desired position on a print surface of a print medium without increasing a burden on a worker and without using a jig.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 4A is an explanatory diagram illustrating a state in which an upper surface of the table is located at an initial position.

FIG. 4B is an explanatory diagram illustrating a state in which an upper surface of a base sheet is located at the initial position.

FIG. 4C is an explanatory diagram illustrating a state in which a print surface of a print medium is located at the initial position.

FIG. 4D is an explanatory diagram illustrating a state in which lines indicating regions arranged in a predetermined pattern are rendered on the upper surface of the base sheet.

FIG. 5A is an explanatory representation illustrating images each taken when a vertical Gray code pattern is projected on the base sheet with no print medium placed thereon, and a vertical spatial code image generated based on the taken images.

FIG. 5B is an explanatory representation illustrating images each taken when a horizontal Gray code pattern is projected on the base sheet with no print medium placed thereon, and a horizontal spatial code image generated based on the taken images.

DETAILED DESCRIPTION OF THE PREFERRED EMBODIMENTS

Hereinafter, preferred embodiments of a printer and a printing method according to the present invention will be described with reference to the accompanying drawings.

As used herein, the term "inkjet method" refers to a printing technique which is based on an inkjet technology using various conventionally known methods including various continuous methods such as a binary deflection method or a continuous deflection method and/or various on-demand methods such as a thermal method or a piezoelectric element method.

Figure 1:
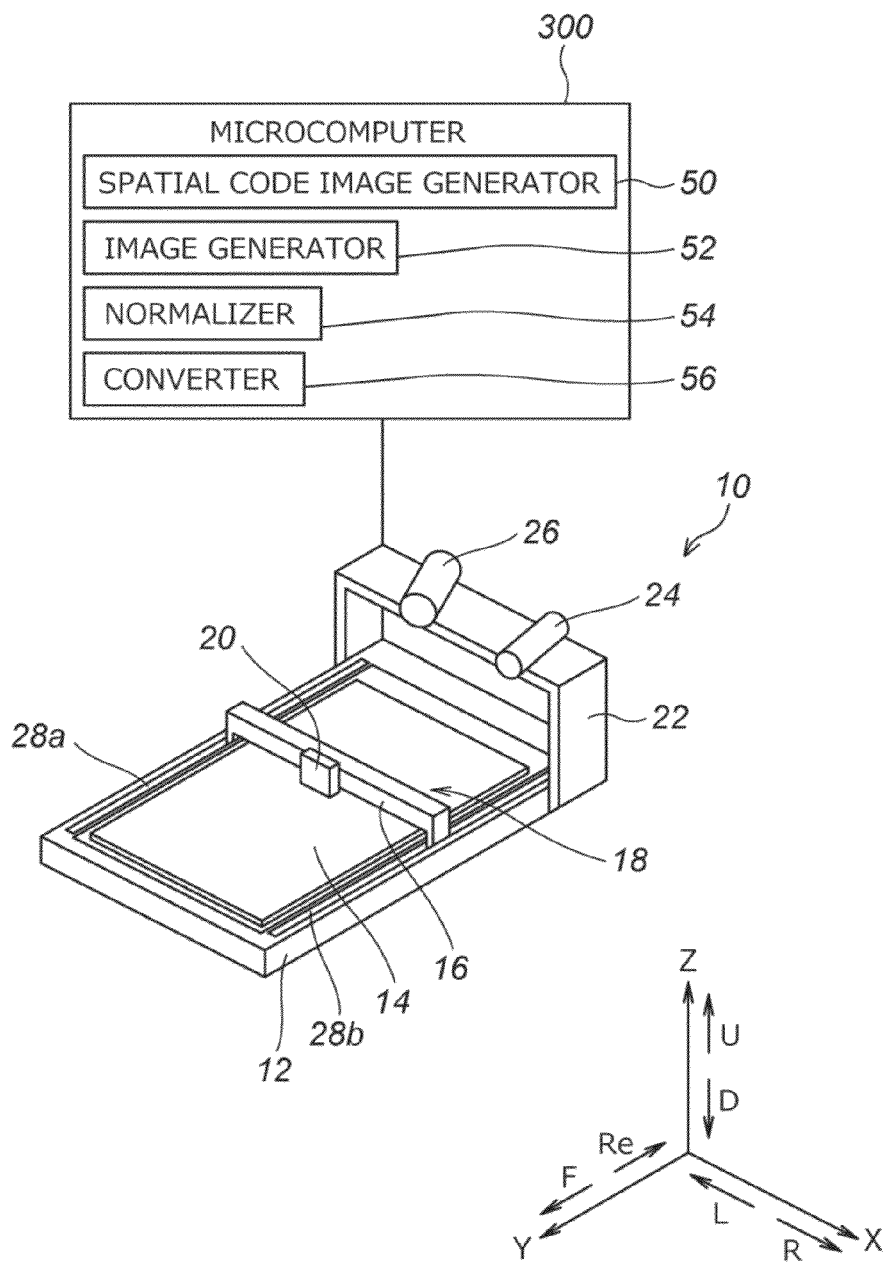
FIG. 1 is an explanatory diagram schematically illustrating a printer according to a preferred embodiment of the present invention.

FIG. 1 is an explanatory diagram schematically illustrating a printer 10. In the following description, the terms "right", "left", "up" and "down" refer to right, left, up and down when viewed from a worker present in front of the printer 10, respectively. A direction toward the worker from the printer 10 is defined as a forward direction, and a direction away from the worker toward the printer 10 is defined as a rearward direction. The reference signs "F", "Re", "R", "L", "U" and "D" in the drawings represent front, rear, right, left, up and down, respectively. The reference sign "X" in the drawings represents an X axis, i.e., a right-left direction (main scanning direction). The reference sign "Y" in the drawings represents a Y axis, i.e., a front-rear direction (sub-scanning direction). The reference sign "Z" in the drawings represents a Z axis, i.e., a vertical direction. It is to be noted that the above directions are defined only for convenience of description and should not be construed as being restrictive. Also note that the term "main scanning direction" refers to a width direction of a three-dimensional print medium 200 (see FIG. 4C), and the term "sub-scanning direction" refers to a direction perpendicular to the main scanning direction.

The printer 10 is a flatbed type inkjet printer. The printer 10 preferably includes a base member 12, a table 14, a rod-shaped member 16, a movable member 18, a print head 20, a vertical member 22, a projector 24, and a camera 26.

The base member 12 preferably includes guide grooves 28a and 28b that extend in a Y-axis direction (front-rear direction).

The table 14 is disposed on the base member 12. The table 14 preferably includes an upper surface 14a. The upper surface 14a of the table 14 has a flat shape. The three-dimensional print medium 200 (see FIG. 4C) is placed over the upper surface 14a of the table 14. The table 14 is movable in a Z-axis direction (vertical direction) within a given range by a moving mechanism (not illustrated). The table 14 is moved in the Z-axis direction, thus allowing the print medium 200 placed over the upper surface 14a of the table 14 to be moved in the Z-axis direction. The range in which the table 14 is moved up and down corresponds to, for example, a range of a thickness of the print medium 200 on which printing can be performed by the printer 10. The movement of the table 14 in the Z-axis direction is controlled by the moving mechanism (not illustrated) based on an input provided by a worker. Note that a conventionally known technique may be used for the moving mechanism for moving the table 14 in the Z-axis direction. A non-limiting example of this moving mechanism is a combination of a gear and a motor.

The movable member 18 preferably includes the rod-shaped member 16 and the print head 20. The movable member 18 is moved in the Y-axis direction (front-rear direction) along the guide grooves 28a and 28b of the base member 12 by a moving mechanism (not illustrated). Note that a conventionally known technique may be used for the moving mechanism for moving the movable member 18 in the Y-axis direction (front-rear direction). A non-limiting example of this moving mechanism is a combination of a gear and a motor.

The rod-shaped member 16 extends in an X-axis direction (right-left direction). The rod-shaped member 16 moves in the Y-axis direction (front-rear direction) above the table 14. A front surface of the rod-shaped member 16 is provided with a guide rail (not illustrated).

The print head 20 is an inkjet head from which ink is ejected by an inkjet method. The print head 20 performs printing on a print surface 200a (see FIG. 4C) of the print medium 200 placed over the table 14. The print head 20 is provided at the rod-shaped member 16. The print head 20 is movable along the guide rail (not illustrated) provided at the front surface of the rod-shaped member 16. The print head 20 is provided with a belt (not illustrated) which is movable in the X-axis direction (right-left direction). The print head 20 is movable in the X-axis direction (right-left direction) with respect to the rod-shaped member 16. The belt is wound by a moving mechanism (not illustrated), thus moving the belt so that the print head 20 is moved from left to right or from right to left in the X-axis direction. Note that a conventionally known technique may be used for the moving mechanism to move the print head 20 in the X-axis direction (right-left direction) by winding the belt. Examples of this moving mechanism include a combination of a gear and a motor.

The vertical member 22 is provided at a rear portion of the base member 12. The vertical member 22 extends upward from the base member 12.

The projector 24 is provided at the vertical member 22. The projector 24 is fixed to the vertical member 22. The projector 24 projects a Gray code pattern on the entire upper surface 14a of the table 14. The projector 24 projects a vertical 8-bit Gray code pattern on the upper surface 14a of the table 14. The projector 24 also projects a horizontal 8-bit Gray code pattern on the upper surface 14a of the table 14.

The camera 26 is provided at the vertical member 22. The camera 26 is fixed to the vertical member 22. The camera 26 is capable of taking an image of the entire upper surface 14a of the table 14 in a direction different from a direction in which the projector 24 projects the Gray code pattern.

As illustrated in FIG. 4C, the print medium 200 preferably has a rectangular or substantially rectangular parallelepiped shape. The print surface 200a of the print medium 200 has a flat shape. When the print medium 200 is placed over the upper surface 14a of the table 14, the print surface 200a is horizontal or substantially horizontal. Note that the shape of the print medium 200 is not limited to a rectangular or substantially rectangular parallelepiped shape.

As illustrated in FIG. 1, the printer 10 is communicably connected to a microcomputer 300. All operations of the printer 10 are controlled by the microcomputer 300. The microcomputer 300 preferably includes a spatial code image generator 50, an image generator 52, a normalizer 54, and a converter 56. The spatial code image generator 50 generates a spatial code image based on an image of the Gray code pattern which is taken by the camera 26. Using the spatial code image generated by the spatial code image generator 50, the image generator 52 generates an image of the print surface 200a (see FIG. 4C) of the print medium 200. Using, as a given orientation, an orientation of the print surface 200a in the image of the print surface 200a generated by the image generator 52, the normalizer 54 normalizes the print surface 200a. The converter 56 converts print data, which is edited on the print surface 200a normalized by the normalizer 54, into data printable on the pre-normalization print surface 200a.

The following description will be made on the assumption that the printer 10 performs desired printing on the flat print surface 200a of the three-dimensional print medium 200. First, in the printer 10, a calibration of the camera 26 (which will hereinafter be referred to as a "camera calibration"), and a calibration between the camera 26 and the upper surface 14a of the table 14 (i.e., a print coordinate system) are performed. Each of the calibrations is performed at a given time, e.g., at the time of shipment from a factory or at the time of replacement of the camera 26.

The camera calibration is performed using a separate display device (e.g., a liquid crystal display) which is independent of the printer 10. Specifically, in performing the camera calibration, an image of a checkered pattern is taken by the camera 26 at the maximum angle of view, and camera parameters are calculated using Zhang's method. In this preferred embodiment, as this checkered pattern, a checkered pattern displayed on the separate display device is used instead of a checkered pattern rendered on the upper surface 14a of the table 14. Note that a technique disclosed in JP 2007-309660 A, for example, is used for a method of calculating camera parameters by Zhang's method, and therefore, detailed description thereof will be omitted.

When the printer 10 is used, only internal parameters (A) of the camera, which include lens distortion coefficients ($k_1$, $k_2$), are utilized by using Equations (1) and (2) calculated by Zhang's method.

Equation 1

$$s\tilde{m} = A[\begin{array}{cc} R & T \end{array}]\tilde{M} \qquad (1)$$

Equation 2

$$\begin{cases} \breve{u} = u + (u - u_0)[k_1(x^2 + y^2) + k_2(x^2 + y^2)^2] \\ \breve{v} = v + (v - v_0)[k_1(x^2 + y^2) + k_2(x^2 + y^2)^2] \end{cases} \qquad (2)$$

After the camera calibration has been performed, the camera 26 is installed on the printer 10, and a calibration to obtain a positional and orientational relationship between the camera 26 and the upper surface 14a of the table 14 (i.e., the calibration between the camera 26 and the upper surface 14a of the table 14) is performed. Specifically, in performing the calibration between the camera 26 and the upper surface 14a of the table 14, a matrix $H_{c2p}$ for projective transformation from an image taken by the camera into an image of a print region is calculated.

Figure 2:
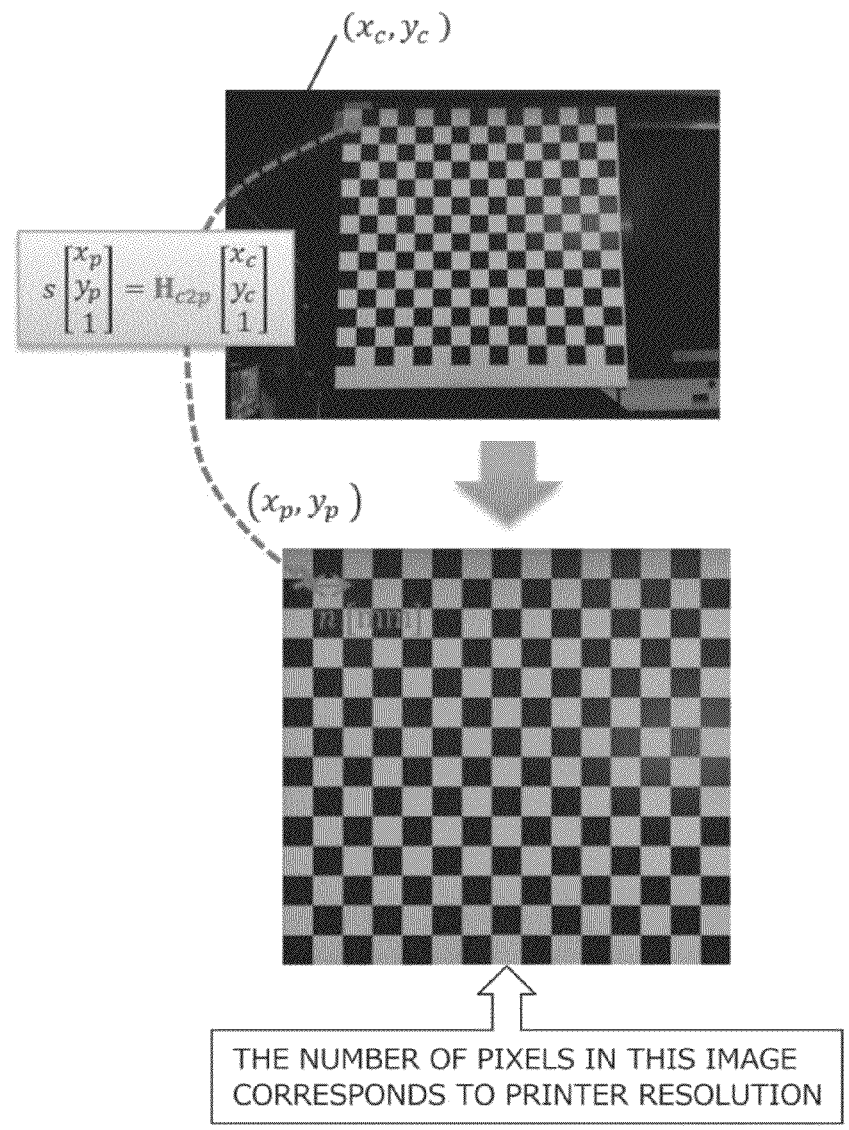
FIG. 2 is an explanatory representation illustrating conversion of a checkered pattern captured by a camera into the number of pixels corresponding to a printer resolution, and projective transformation of an image taken by the camera into a reference coordinate system of a table.

First, an image is taken, with nothing placed over the table 14. In this case, as illustrated in FIG. 2, a checkered pattern in which checkers are arranged in a given pattern is rendered on the table 14. Next, using Equation (2), lens distortion of the taken image (i.e., the image of the checkered pattern rendered on the table 14) is corrected. Subsequently, checker intersection coordinates are estimated with sub-pixel precision. Then, as illustrated in FIG. 2, the checkered pattern is converted into the number of pixels corresponding to a printer resolution, and the projective transformation matrix $H_{c2p}$ to transform the checker intersection coordinates into pixel coordinates is obtained.

Equation 3

$$s\begin{bmatrix} x_p \\ y_p \\ 1 \end{bmatrix} = H_{c2p}\begin{bmatrix} x_c \\ y_c \\ 1 \end{bmatrix}, H_{c2p} = \begin{bmatrix} h_{11} & h_{12} & h_{13} \\ h_{21} & h_{22} & h_{23} \\ h_{31} & h_{32} & h_{33} \end{bmatrix} \qquad (3)$$

Assuming that dimensions of each checker of the checkered pattern are defined as n (mm) and the printer resolution is defined as r (dpi), the number of pixels of each checker after the transformation is r×n/25.4. Then, n sets of image coordinate values obtained before and after the transformation are applied to Equation (3).

Equation 4

$$\begin{cases} sx_{pn} = h_{11}x_{cn} + h_{12}y_{cn} + h_{13} \\ sy_{pn} = h_{21}x_{cn} + h_{22}y_{cn} + h_{23} \\ s = h_{31}x_{cn} + h_{32}y_{cn} + h_{33} \end{cases}$$

Equation 5

$$\begin{cases} h_{11}x_{cn} + h_{12}y_{cn} + h_{13} - h_{31}x_{cn}x_{pn} - h_{32}y_{cn}x_{pn} - h_{33}x_{pn} = 0 \\ h_{21}x_{cn} + h_{22}y_{cn} + h_{23} - h_{31}x_{cn}y_{pn} - h_{32}y_{cn}y_{pn} - h_{33}y_{pn} = 0 \end{cases}$$

Equation 6

$$\begin{bmatrix} x_{c1} & y_{c1} & 1 & 0 & 0 & 0 & -x_{c1}x_{p1} & -y_{c1}x_{p1} & -x_{p1} \\ 0 & 0 & 0 & x_{c1} & y_{c1} & 1 & -x_{c1}y_{p1} & -y_{c1}y_{p1} & -y_{p1} \\ & & & & \vdots & & & & \\ x_{cn} & y_{cn} & 1 & 0 & 0 & 0 & -x_{cn}x_{pn} & -y_{cn}x_{pn} & -x_{pn} \\ 0 & 0 & 0 & x_{cn} & y_{cn} & 1 & -x_{cn}y_{pn} & -y_{cn}y_{pn} & -y_{pn} \end{bmatrix}$$

$$\begin{bmatrix} h_{11} \\ h_{12} \\ \vdots \\ h_{32} \\ h_{33} \end{bmatrix} = \begin{bmatrix} 0 \\ 0 \\ \vdots \\ 0 \\ 0 \end{bmatrix}$$

When this equation (Equation 6) is expressed as B·h=0, h is obtained as a right singular vector corresponding to the minimal singular value of B or a characteristic vector corresponding to the minimal characteristic value of $B^T B$ (for example, a function such as OpenCV 2.x or SVD::solvez( ) is utilized). Note that a conventionally known technique (see, for example, Gang Xu, "3D CG from Photographs", Kindai Kagaku Sha), for example, is preferably used for the above-described calibration between the camera 26 and the upper surface 14a of the table 14, and therefore, detailed description thereof will be omitted.

Figure 3A:
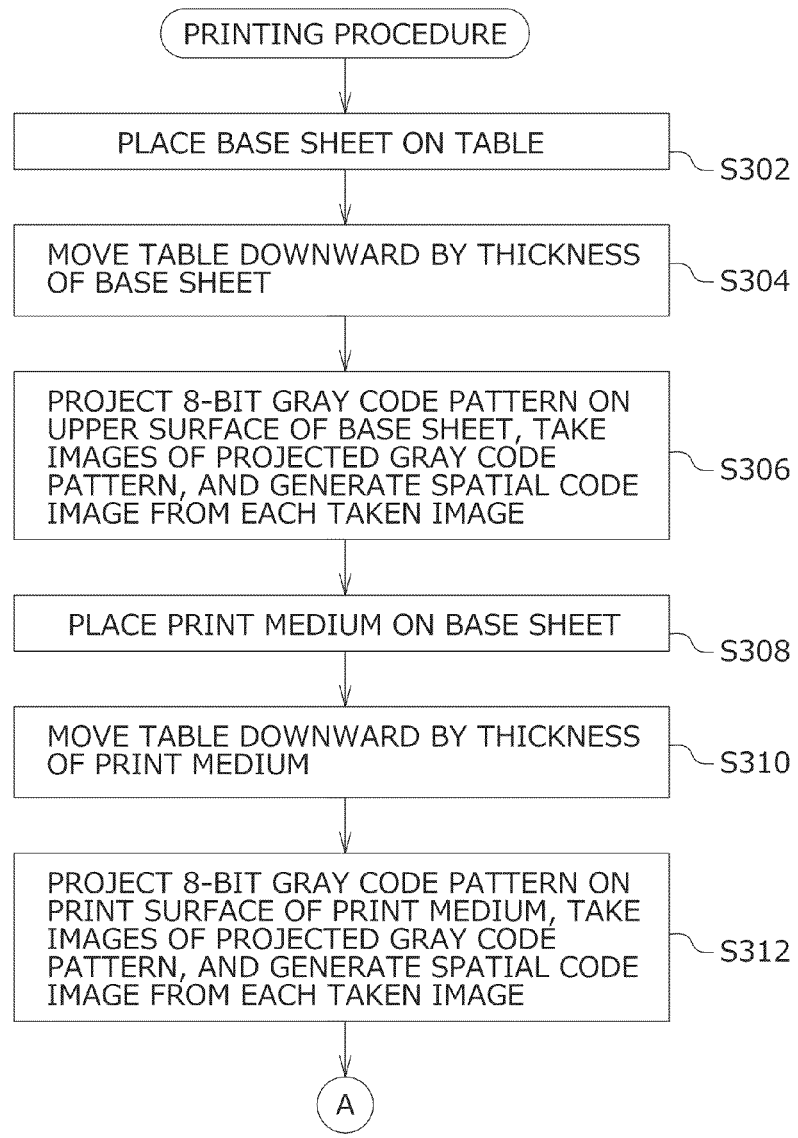
FIGS. 3A and 3B are flow charts describing a procedure for performing printing by using the printer according to a preferred embodiment of the present invention.
Figure 3B:
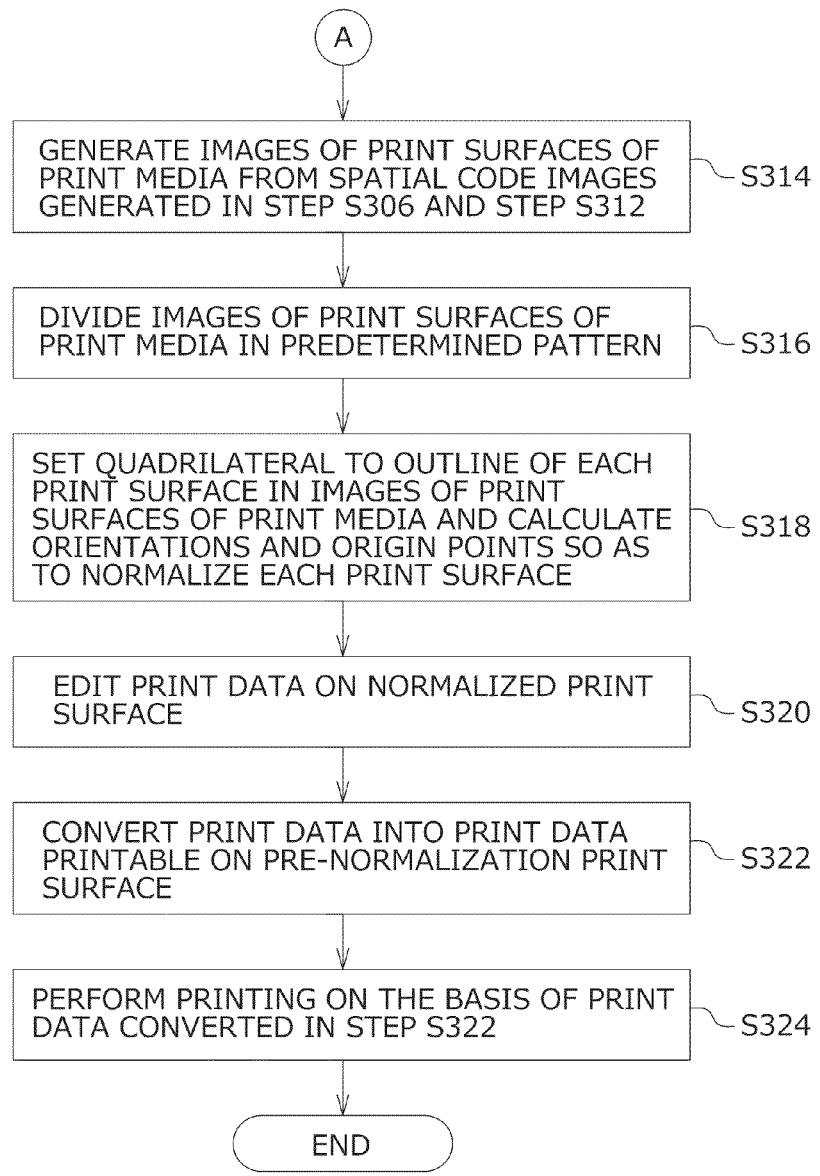

Next, a printing procedure for performing printing on the print surface 200a of the print medium 200 by the printer 10, in which the above-described camera calibration and calibration between the camera 26 and the upper surface 14a of the table 14 have been performed, will be described with reference to FIGS. 3A and 3B.

First, in Step S302, a worker places a base sheet 30 on the upper surface 14a of the table 14 of the activated printer 10 in a state where the movable member 18 is located directly below the vertical member 22 (see FIG. 4B).

In this preferred embodiment, the state where the movable member 18 is located directly below the vertical member 22 means a state where a Gray code pattern can be projected onto the table 14 by the projector 24 without casting a shadow of the movable member 18 or the print head 20 on the table 14, and the movable member 18 or the print head 20 is not captured when an image of the Gray code pattern is taken by the camera 26. Note that if this state is created, the movable member 18 does not have to be located directly below the vertical member 22.

In Step S304, the table 14 is moved downward by a thickness t1 of the base sheet 30. Specifically, the table 14 is moved downward so that an upper surface 30a of the base sheet 30 is located at a position taken up by the upper surface 14a of the table 14 at the time of the calibration (see FIGS. 4A and 4B). Hereinafter, the position taken up by the upper surface 14a of the table 14 at the time of the calibration will be referred to as an "initial position" as appropriate.

More specifically, when the thickness t1 of the base sheet 30 is 2 mm, for example, the base sheet 30 is placed on the table 14, the upper surface 14a of which is located at the initial position, and then the worker moves the table 14 downward by 2 mm, for example. Note that the base sheet 30 preferably is an adhesive sheet, and therefore, the print medium 200 is not easily moved once the print medium 200 is placed on the upper surface 30a.

In Step S306, the microcomputer 300 controls the printer 10 so that an 8-bit Gray code pattern is projected on the upper surface 30a of the base sheet 30 from the projector 24. The camera 26 takes an image of the projected Gray code pattern. The spatial code image generator 50 generates a spatial code image based on each image taken by the camera 26.

Specifically, as illustrated in FIG. 5A, a vertical Gray code pattern, which is a Gray code pattern that has been vertically changed with respect to a print surface, is projected on the upper surface 30a of the base sheet 30 from the projector 24, and the camera 26 takes an image of the projected vertical Gray code pattern. The spatial code image generator 50 generates a vertical spatial code image without the print medium 200 based on each image taken by the camera 26. Furthermore, as illustrated in FIG. 5B, a horizontal Gray code pattern, which is a Gray code patern that has been horizontally changed with respect to a print surface, is projected on the upper surface 30a of the base sheet 30 from the projector 24, and the camera 26 takes an image of the projected horizontal Gray code pattern. The spatial code image generator 50 generates a horizontal spatial code image without the print medium 200 based on each image taken by the camera 26.

Upon acquisition of the vertical and horizontal spatial code images without the print medium 200, the worker places the print medium 200 on the upper surface 30a of the base sheet 30 in Step S308 (see FIG. 4C). In this case, the worker may roughly arrange a plurality of the print media 200 along the X-axis direction (right-left direction) and the Y-axis direction (front-rear direction). The print media 200 may be inclined to some extent with respect to the X axis or the Y axis. The plurality of print media 200 are arranged on the upper surface 30a of the base sheet 30 so that the print media 200 adjacent to each other are located at intervals. More specifically, the plurality of print media 200 are disposed in regions arranged in a predetermined pattern on the upper surface 30a of the base sheet 30 (see FIG. 4d). Note that the regions arranged in the predetermined pattern are stored in the microcomputer 300. Lines (grid) 32 serving as boundaries of these regions are rendered on the upper surface 30a of the base sheet 30. Alternatively, marks may be rendered instead of the lines 32.

After the print media 200 have been placed on the upper surface 30a of the base sheet 30, the worker operates the operator (not illustrated) in Step S310. Thus, the table 14 is moved downward by a thickness t2 of each print medium 200. In other words, the table 14 is moved downward so that the print surface 200a of each print medium 200 is located at the initial position (see FIG. 4C).

Specifically, when the thickness t2 of each print medium 200 is 10 mm, for example, the print media 200 are placed on the upper surface 30a of the base sheet 30 with the upper surface 30a located at the initial position, and then the worker moves the table 14 downward by 10 mm, for example.

In Step S312, the microcomputer 300 controls the printer 10 so that an 8-bit Gray code pattern is projected on the print surface 200a of each print medium 200 and the upper surface 30a of the base sheet 30 from the projector 24. The camera 26 takes an image of the projected Gray code pattern. The spatial code image generator 50 generates a spatial code image based on each image taken by the camera 26.

Figures 6A, 6B:
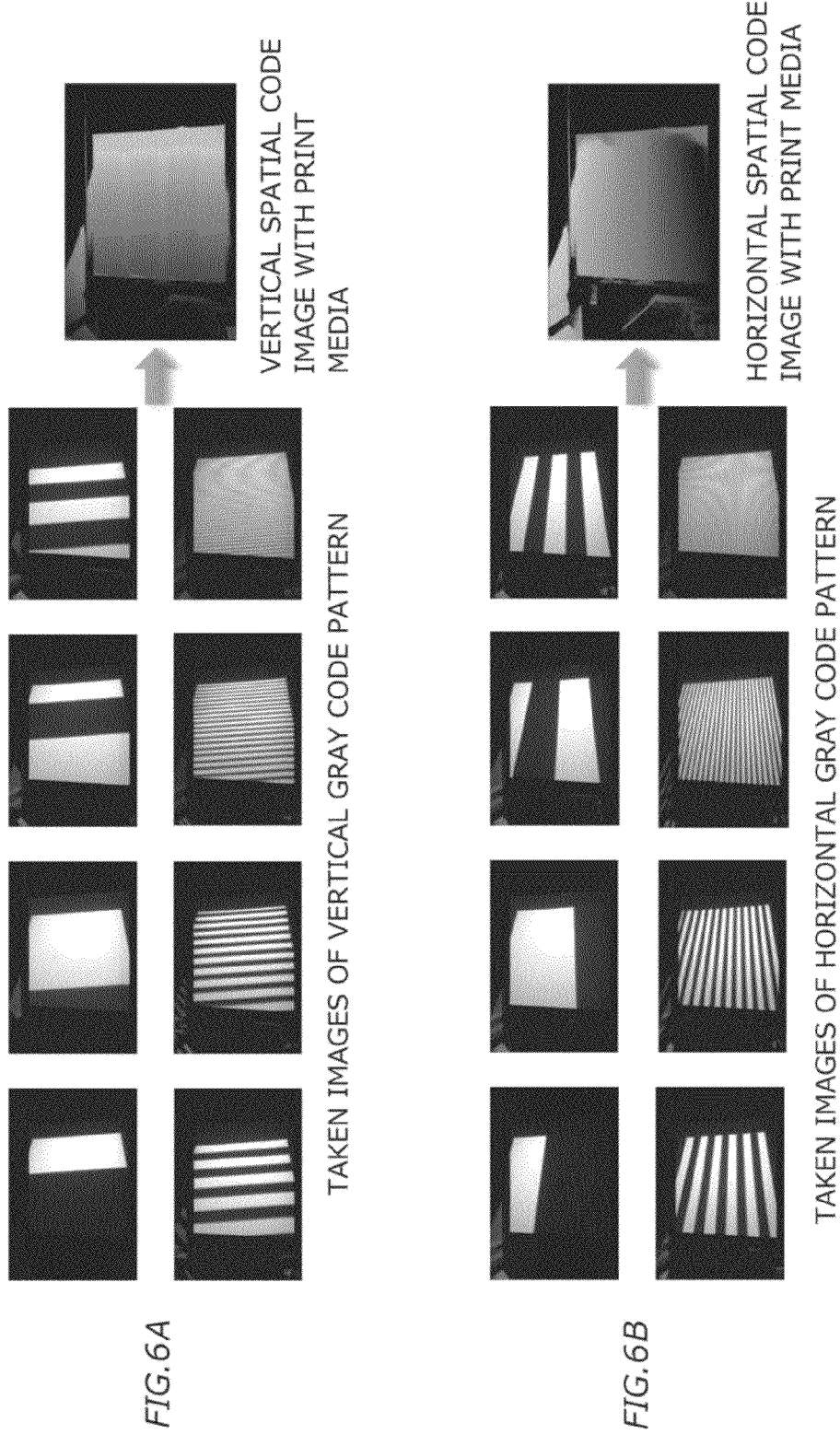
FIG. 6A is an explanatory representation illustrating images each taken when a vertical Gray code pattern is projected on the print surface of each print medium with the print medium placed on the base sheet, and a vertical spatial code image generated based on the taken images.
FIG. 6B is an explanatory representation illustrating images each taken when a horizontal Gray code pattern is projected on the print surface of each print medium with the print medium placed on the base sheet, and a horizontal spatial code image generated based on the taken images.

Specifically, as illustrated in FIG. 6A, a vertical Gray code pattern is projected on the print surface 200a of each print medium 200 and the upper surface 30a of the base sheet 30 from the projector 24, and the camera 26 takes an image of the projected vertical Gray code pattern. The spatial code image generator 50 generates a vertical spatial code image with the print media 200 based on each image taken by the camera 26. Furthermore, as illustrated in FIG. 6B, a horizontal Gray code pattern is projected on the print surface 200a of each print medium 200 and the upper surface 30a of the base sheet 30 from the projector 24, and the camera 26 takes an image of the projected horizontal Gray code pattern. The spatial code image generator 50 generates a horizontal spatial code image with the print media 200 based on each image taken by the camera 26.

Upon acquisition of the vertical and horizontal spatial code images with the print media 200, the image generator 52 generates an image of the print surface 200a of each print medium 200 by combining the vertical spatial code image without print media and the horizontal spatial code image without print media and by combining the vertical spatial code image with print media and the horizontal spatial code image with print median Step S314.

In this preferred embodiment, the spatial code images generated in Step S306 (i.e., the vertical and horizontal spatial code images without the print medium 200) and the spatial code images generated in Step S312 (i.e., the vertical and horizontal spatial code images with the print media 200) have the same code value only at surfaces located at the initial position. The image generator 52 obtains a difference between the spatial code images generated in Step S306 and the spatial code images generated in Step S312 to extract the image of the print surface 200a of each print medium. 200, thus generating the image of the print surface 200a of each print medium 200.

Figures 7A, 7B, 7C:
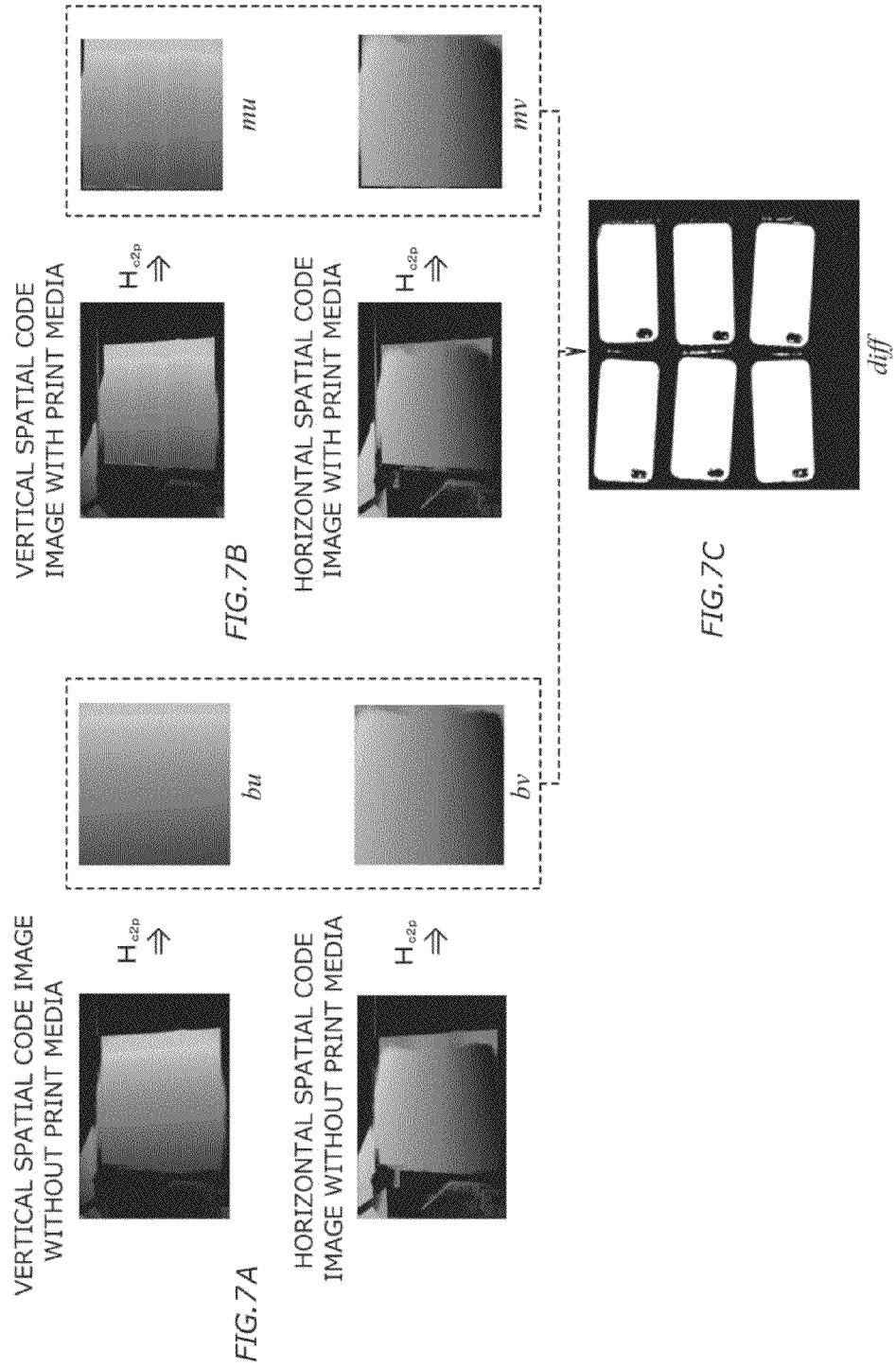
FIG. 7A is an explanatory representation illustrating images obtained by projective transformation of print regions of the vertical and horizontal spatial code images without the print media into reference print regions.
FIG. 7B is an explanatory representation illustrating images obtained by projective transformation of print regions of the vertical and horizontal spatial code images with the print media into reference print regions.
FIG. 7C is an explanatory representation illustrating an image of the print surface of each print medium which is generated by using the images illustrated in FIGS. 7A and 7B.

Specifically, as illustrated in FIG. 7C, in an image "diff" of the print surface 200a of each print medium 200, a pixel i is presented in white or black based on the following equation:

$$diff_i = \begin{cases} 255, & \sqrt{(bu_i - mu_i)^2 + (bv_i - mv_i)^2} < \text{THRESH} \\ 0, & \text{otherwise} \end{cases} \qquad \text{Equation 7}$$

As illustrated in FIG. 7A, "bu" is an image obtained by performing projective transformation of only a print region selected from the vertical spatial code image without the print media. "$bu_i$" represents an ith pixel in the image "bu". "bv" is an image obtained by performing projective transformation with the projective transformation matrix $H_{c2p}$ of only a print region, selected from the horizontal spatial code image without the print media, into a reference print region serving as a printable region on the upper surface 14a of the table 14. "bvi" represents an ith pixel in the image "bv".

As illustrated in FIG. 7B, "mu" is an image obtained by performing projective transformation of only a print region selected from the vertical spatial code image with the print media. "mu" represents an ith pixel in the image "mu". "mv" is an image obtained by performing projective transformation with the transformation matrix $H_{c2p}$ of only a print region, selected from the horizontal spatial code image with the print media, into the reference print region. "$mv_i$" represents an ith pixel in the image "mv".

In Equation (7), "255" represents white. "0" represents black. THRESH is set to "2", for example.

Figure 8A:
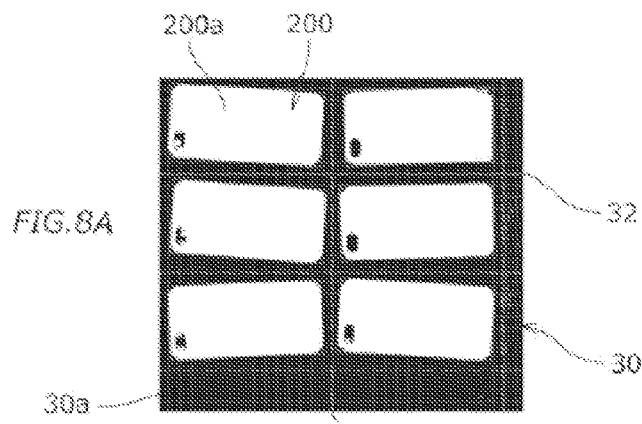
FIG. 8A is an explanatory representation illustrating a state in which the images of the print surfaces of the print media are divided.

The print media 200 are disposed in the regions arranged in the predetermined pattern defined on the upper surface 30a of the base sheet 30. Therefore, in Step S316, the normalizer 54 divides the images of the print surfaces 200a of the print media 200, which have been generated in Step S314, in accordance with the predetermined pattern (see FIG. 8A).

Figure 8B:
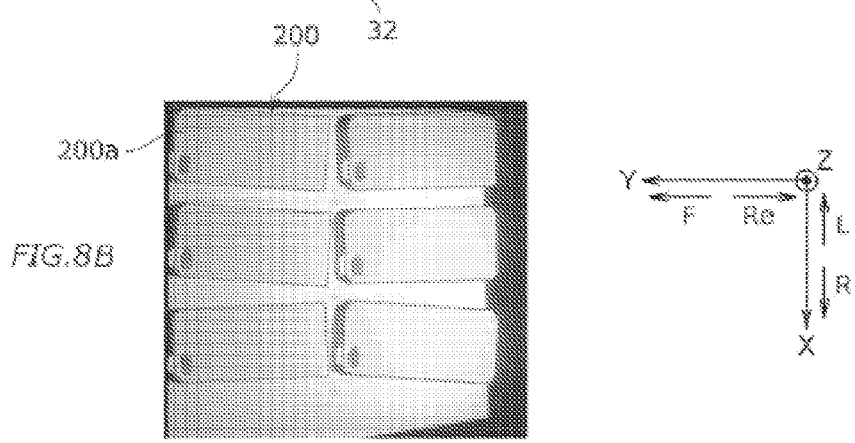
FIG. 8B is an explanatory representation illustrating a state in which a quadrilateral is set to an outline of each print surface in the image of the print surface of the print medium.
Figure 8C:
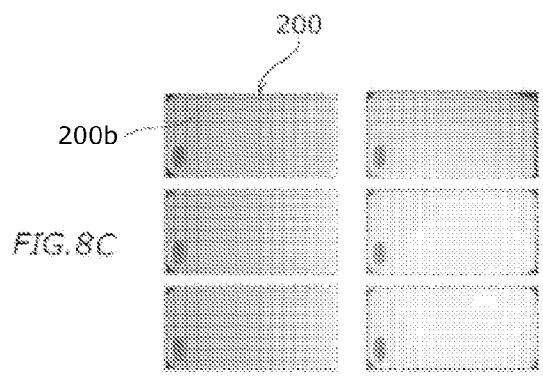
FIG. 8C is an explanatory representation illustrating a state in which an orientation of each print surface is normalized.

In Step S318, using a rotating calipers method (rotating calipers algorithm), the normalizer 54 sets a quadrilateral to an outline of each print surface 200a in the image of the print surface 200a of the print media (see FIG. 8B). The normalizer 54 calculates the orientation and origin point of each print surface 200a, and performs projective transformation of each print surface 200a, thus normalizing each print surface 200a so as to change the orientation of each print surface 200a to a given orientation 200b (see FIG. 8C). As used herein, the term "given orientation" refers to, for example, an orientation in which each side of the print surface 200a is parallel to the X axis or Y axis.

Figure 9A:
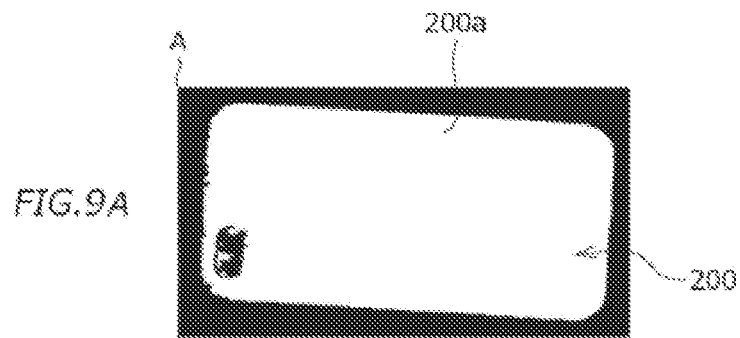
FIG. 9A is an explanatory representation illustrating a state in which the print surface is filled in with white.
Figure 9B:
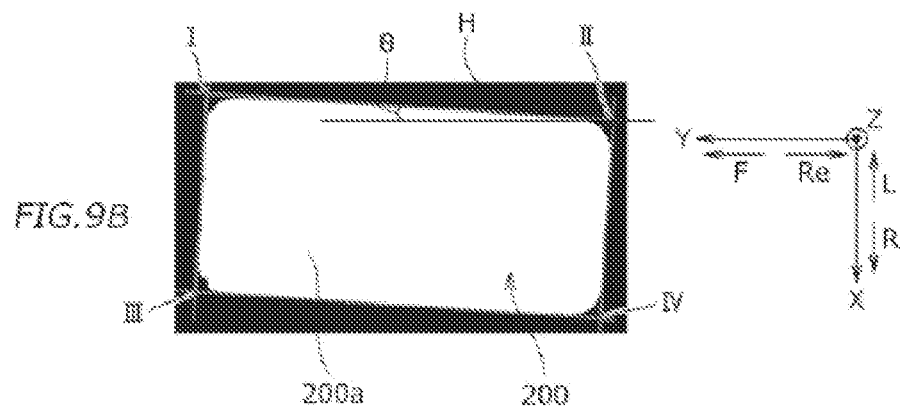
FIG. 9B is an explanatory representation illustrating a state in which a quadrilateral is set to the outline of the print surface by using a rotating calipers method (rotating calipers algorithm).
Figure 9C:
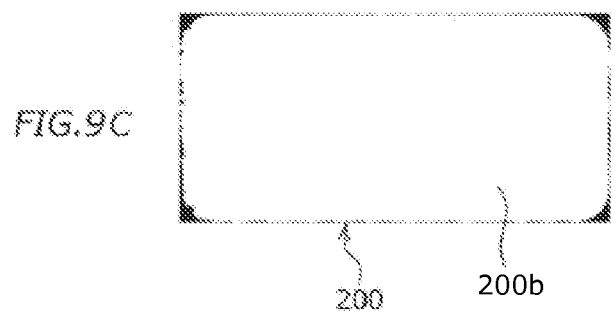
FIG. 9C is an explanatory representation illustrating a state in which the orientation of the print surface is normalized.

FIGS. 9A, 9B and 9C are explanatory representations illustrating a procedure for normalizing the orientation of the print surface 200a. As illustrated in FIG. 9A, the normalizer 54 first fills in the print surface 200a with white (=255). Specifically, the normalizer 54 sequentially searches for a pixel of black (=0) from an origin point A of the region for the print surface 200a, sets, using the black pixel as a starting point, a region where the black pixels are continuous as white pixels (=255) in another image buffer of the same size, and then turns the black pixels white and vice versa. Although the origin point A of the region for the print surface 200a is a point located at an upper left end of each of the regions arranged in the predetermined pattern in the present preferred embodiment, the location of the origin point A is not limited to this point.

Next, as illustrated in FIG. 9B, using a rotating calipers method, a quadrilateral is set to the outline of the print surface 200a filled in with white. Note that this rotating calipers method is a conventionally known technique, and therefore, detailed description thereof will be omitted.

Then, a rotation matrix R is obtained. Using the rotation matrix R, a straight line H, connecting an upper left end point I of the quadrilateral and an upper right end point II of the quadrilateral, is made parallel to the Y axis. Assuming that an angle formed between the Y axis and the straight line H connecting the points I and II is θ, the rotation matrix R is represented as follows:

$$R = \begin{bmatrix} \cos\theta & \sin\theta & 0 \\ -\sin\theta & \cos\theta & 0 \\ 0 & 0 & 1 \end{bmatrix}$$

Equation 8

Using this rotation matrix R, coordinate values of four points of the quadrilateral, i.e., the point I, the point II, a lower left end point III and a lower right end point IV of the quadrilateral, are transformed. Subsequently, a translational transformation matrix T for moving the coordinates of the point I after the transformation (i.e., minX, minY) to the origin point is obtained.

$$T = \begin{bmatrix} 1 & 0 & -\text{minX} \\ 0 & 1 & -\text{minY} \\ 0 & 0 & 1 \end{bmatrix}$$

Equation 9

Upon combining the transformation matrices, i.e., upon combining the rotation matrix R and the translational transformation matrix T in this order, a matrix $H_{p2en}$ for transformation from a print region image coordinate system (p) to an editing image coordinate system (en) for the print medium 200 of No. n is obtained. Note that each print medium 200 is numbered in accordance with its location.

$$H_{p2en} = T \cdot R$$

Upon transformation of the image coordinate system of the print surface 200a such as one illustrated in FIG. 9A by the transformation matrix $H_{p2en}$, the print surface 200a is changed to the given orientation 200b as illustrated in FIG. 9C. In other words, the print surface 200a is normalized. Accordingly, image data of the normalized print surface 200a is acquired.

Figure 10A:
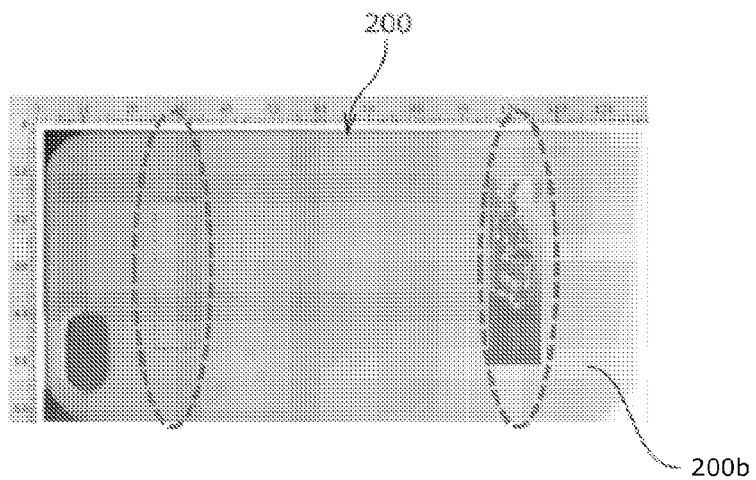
FIG. 10A is an explanatory representation illustrating a state in which print data is edited on the normalized print surface.

Upon normalization of the print surface 200a, the worker edits, on the normalized print surface 200a, print data to be printed on the print surface 200a in Step S320. Specifically, when editing print data by utilizing editing software capable of editing print data, the worker edits the print data on the image data of the changed print surface 200b. Thus, as illustrated in FIG. 10A, the worker decides where to perform printing on the print surface 200a, and what kind of design to print. Examples of the design to be printed include a graphic form, a character and a picture.

Figure 10B:
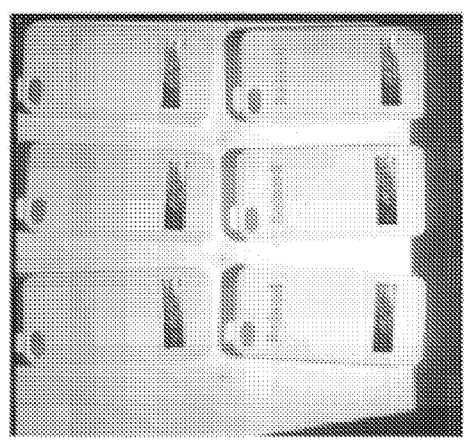
FIG. 10B is an explanatory representation illustrating print data obtained by converting the print data of FIG. 10A into data printable on the pre-normalization print surface.
Figure 10C:
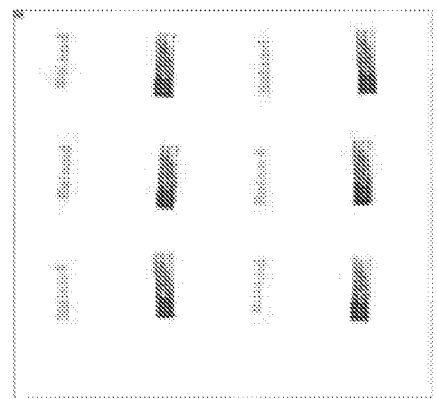
FIG. 10C is an explanatory representation illustrating print data obtained by converting the print data of FIG. 10A into data printable on the pre-normalization print surface.

Upon completion of editing of the print data by the worker, the converter 56 converts the edited print data into print data printable on the pre-normalization print surface 200a in Step S322. Specifically, using an inverse transformation matrix for the transformation matrix $H_{p2en}$ calculated before the normalization of the print surface 200a, the print data edited by the worker in Step S320 is transformed, and the transformed print data is stored as print data to be used in actual printing (see FIGS. 10B and 10C).

After the print data has been generated in Step S322, the worker provides an instruction to start printing and then the microcomputer 300 controls the printer 10 so as to perform printing based on the generated print data in Step S324.

As described above, in the printer 10 according to the present preferred embodiment, images are taken while an 8-bit Gray code pattern is projected on the base sheet 30 with no print medium 200 placed on the base sheet 30, and vertical and horizontal spatial code images are acquired by the spatial code image generator 50 based on the taken images. Furthermore, images are taken while an 8-bit Gray code pattern is projected on the print media 200 with the print media 200 placed on the base sheet 30, and vertical and horizontal spatial code images are acquired by the spatial code image generator 50 based on the taken images.

Note that the position of the upper surface 30a of the base sheet 30 when no print medium 200 is placed on the base sheet 30 and the position of the print surface 200a of the print medium 200 when the print medium 200 is placed on the base sheet 30 coincide with the position of the upper surface 14a of the table 14 in the Z-axis direction (vertical direction) which is located at the time of the calibration.

Then, the image generator 52 obtains a difference between the vertical and horizontal spatial code images with no print medium 200 and the vertical and horizontal spatial code images with the print media 200, thus acquiring an image of the print surface 200a of each print medium 200.

Subsequently, the normalizer 54 sets a quadrilateral to an outline of each print surface 200a in the image of the print surface 200a of each print medium 200 and calculates the orientation and origin point of each print surface 200a so as to normalize each print surface 200a.

When print data to be printed on each print surface 200a has been edited by the worker on the normalized print surface 200a, the converter 56 converts the print data, edited by the worker, into print data printable on the pre-normalization print surface 200a, and stores this print data.

Then, using the converted print data, printing is performed on the print surface 200a of each print medium 200.

Although the worker has to perform an operation such as lowering of the table 14, the printer 10 according to the present preferred embodiment does not require an exacting operation such as accurate positioning. Consequently, unlike a conventional printer, the printer 10 according to the present preferred embodiment is capable of performing printing on the three-dimensional print medium 200 by simple operations.

The printer 10 according to the present preferred embodiment is capable of performing printing on the three-dimensional print medium 200 without using a jig.

Even when the print media 200 are produced in low quantities, the printer 10 according to the present preferred embodiment is capable of performing printing on the print media 200 without incurring an increase in cost.

Although one preferred embodiment of the present invention has been described thus far, the present invention is not limited to the above-described preferred embodiment but may be embodied in various other forms. Alternative exemplary preferred embodiments of the present invention will be described below.

Although the printer 10 has been described as preferably an inkjet printer in the foregoing preferred embodiment, the printer according to the present invention is not limited to an inkjet printer. Various printers such as a dot-impact printer and a laser printer, for example, may be used as the printer 10.

Although the print medium 200 is preferably placed over the table 14 with the base sheet 30 interposed therebetween in the foregoing preferred embodiment, the print medium 200 does not necessarily have to be placed in this manner. Alternatively, the print medium 200 may be directly placed on the table 14 without the base sheet 30 interposed therebetween. In that case, the print medium 200 and/or the upper surface 14a of the table 14 may be processed so that the print medium 200 is less prone to slip along the upper surface 14a of the table 14.

Although the six print media 200 are preferably placed on the base sheet 30 and printing is performed on the print surface 200a of each print medium 200 in the foregoing preferred embodiment, the number of the print media 200 to be placed is not limited to six. For example, the number of the print media 200 to be placed on the base sheet 30 may be one, two, three, four, five, or seven or more. The regions arranged in the predetermined pattern may alternatively be arranged in a different pattern so that printing is performed on larger print media or smaller print media.

In the foregoing preferred embodiment, the print head 20 is preferably moved in the X-axis direction (right-left direction) along the rod-shaped member 16 and moved in the Y-axis direction (front-rear direction) together with the movable member 18, and the table 14 is moved in the Z-axis direction (vertical direction), but movements of the print head 20 and the table 14 are not limited to these movements. For example, as illustrated in FIG. 11, the printer may be arranged so that the table 14 movable up and down in the Z-axis direction is moved in the Y-axis direction, and the print head 20 is moved in the X-axis direction.

Figure 11:
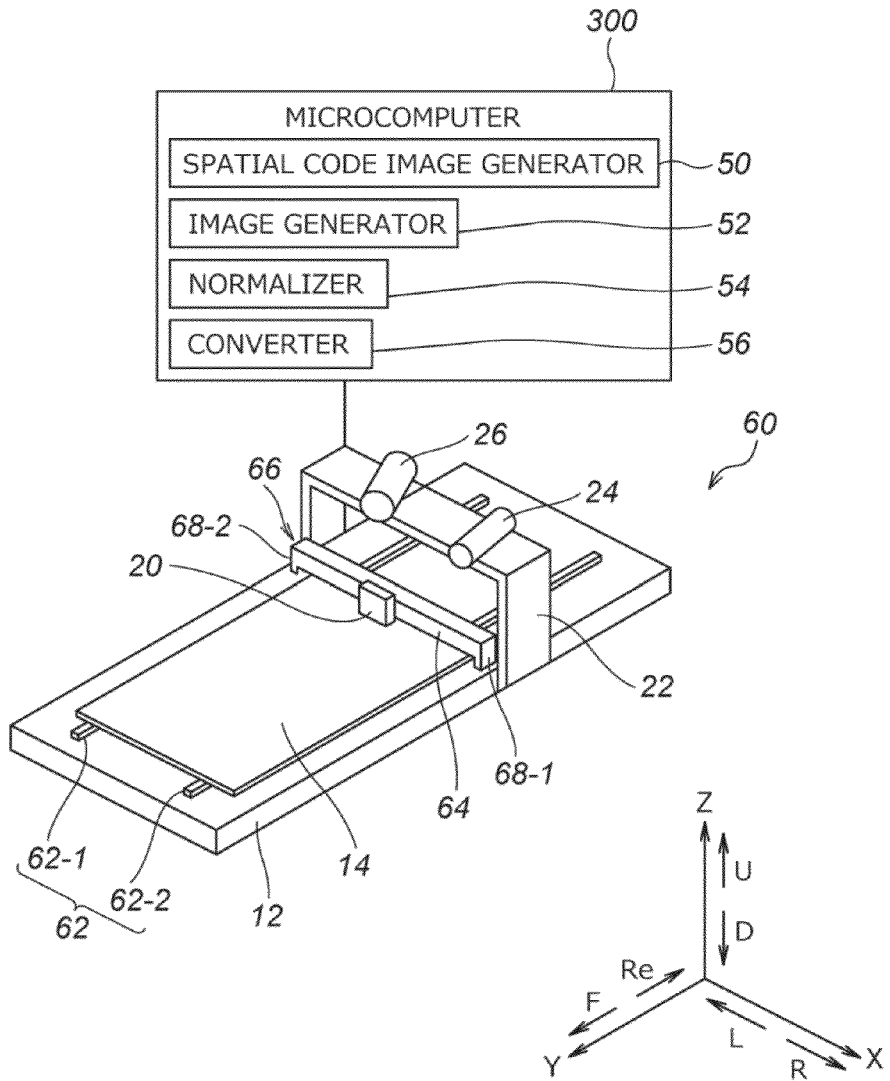
FIG. 11 is an explanatory diagram schematically illustrating a printer according to an alternative preferred embodiment of the present invention.

In a printer 60 illustrated in FIG. 11, the table 14 preferably is movable along guide rails 62 provided on the base member 12. The guide rails 62 preferably include a pair of guide rails 62-1 and 62-2 which extend in the Y-axis direction (front-rear direction) on the base member 12. Note that the table 14 is provided with a driving mechanism (not illustrated) controlled by the microcomputer 300 so that the table 14 is moved in the Y-axis direction along the guide rails 62. Thus, the table 14 movable in the Z-axis direction is also movable in the Y-axis direction on the base member 12.

The print head 20 preferably is movably provided at a fixed member 66 provided on the base member 12. More specifically, the print head 20 preferably is provided at a rod-shaped member 64 so as to be movable along the X-axis direction (right-left direction). Thus, the print head 20 preferably is moved in the X-axis direction along the fixed member 66. The fixed member 66 preferably includes: vertical members 68-1 and 68-2 provided on the base member 12; and the rod-shaped member 64 through which the vertical members 68-1 and 68-2 are connected to each other. The rod-shaped member 64 extends in the X-axis direction.

The foregoing preferred embodiment and the alternative preferred embodiments described above may be combined as appropriate.

The terms and expressions used herein are provided for explanation purposes and should not be construed as being restrictive. It should be appreciated that the terms and expressions used herein do not eliminate any equivalents of features illustrated and mentioned herein, but allow various modifications falling within the claimed scope of the present invention. The present invention may be embodied in many different forms. The present disclosure is to be considered as providing examples of the principles of the present invention. These examples are described herein with the understanding that such examples are not intended to limit the present invention to preferred embodiments described herein and/or illustrated herein. Hence, the present invention is not limited to the preferred embodiments described herein. The present invention includes any and all preferred embodiments including equivalent elements, modifications, omissions, combinations, adaptations and/or alterations as would be appreciated by those skilled in the art based on the present disclosure. The limitations in the claims are to be interpreted broadly based on the language included in the claims and not limited to examples described in the present specification or during the prosecution of the application.

Preferred embodiments and alternatives and modifications of preferred embodiments of the present invention are suitable for use in a printer for performing desired printing on a print medium having a flat print surface.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A flatbed type printer for performing printing based on print data, the printer comprising:
    a table including an upper surface on or over which a print medium including a flat print surface is to be placed, and that is movable at least in a Z-axis direction of an XYZ rectangular coordinate system which includes a Y-axis direction and the Z-axis direction;
    a print head disposed above the table and movable at least in an X-axis direction of the XYZ rectangular coordinate system which includes the X-axis direction and the Y-axis direction;
    a projecting unit configured to project a Gray code pattern on the table;
    an image taking unit configured to take an image of the Gray code pattern projected on the table by the projecting unit;
    a generating unit configured to generate a first spatial code image based on the image of the Gray code pattern taken by the image taking unit while the Gray code pattern is projected from the projecting unit, with the print medium not placed on or over the table whose upper surface is located at a given position in the Z-axis direction, and configured to generate a second spatial code image based on the image of the Gray code pattern taken by the image taking unit while the Gray code pattern is projected from the projecting unit, with the print medium placed on or over the table so that the print surface of the print medium is located at the given position;

an image generating unit configured to generate an image of the print surface of the print medium by determining a difference between the first and second spatial code images;

a normalizing unit configured to change an orientation of the print surface to a given orientation in the image of the print surface of the print medium; and a converting unit configured to convert print data edited on the print surface that has been changed by the normalizing unit, into data printable on the print surface before being changed by the normalizing unit.

2. The printer according to claim 1, wherein the table is movable in the Y-axis direction and the Z-axis direction, and the print head is movable in the X-axis direction.

3. The printer according to claim 1, wherein the table is movable in the Z-axis direction, and the print head is movable in the X-axis direction and the Y-axis direction.

4. The printer according to claim 1, wherein the normalizing unit is configured to set a quadrilateral to an outline of the print surface in the image of the print surface of the print medium and to calculate an orientation of the print surface so as to change the orientation of the print surface to the given orientation.

5. The printer according to claim 1, wherein the projecting unit is configured to project an 8-bit Gray code pattern.

6. The printer according to claim 1, wherein the print head is an inkjet head from which ink is ejected by an inkjet method.

7. A printing method for a flatbed type printer for performing printing based on print data, the printer including a table that includes an upper surface on or over which a print medium including a flat print surface is to be placed, and that is movable at least in a Z-axis direction of an XYZ rectangular coordinate system which includes a Y-axis direction and the Z-axis direction, a print head disposed above the table and movable at least in an X-axis direction of the XYZ rectangular coordinate system which includes the X-axis direction and the Y-axis direction, a projecting unit configured to project a Gray code pattern on the table, and an image taking unit configured to take an image of the Gray code pattern projected on the table by the projecting unit, wherein the printing method comprises steps of:

generating a first spatial code image using the image of the Gray code pattern taken by the image taking unit while the Gray code pattern is projected from the projecting unit, with the print medium not placed on or over the table whose upper surface is located at a given position in the Z-axis direction;

generating a second spatial code image using the image of the Gray code pattern taken by the image taking unit while the Gray code pattern is projected from the projecting unit, with the print medium placed on or over the table so that the print surface of the print medium is located at the given position;

generating an image of the print surface of the print medium based on the first and second spatial code images;

changing an orientation of the print surface to a given orientation in the image of the print surface of the print medium; and converting print data edited on the print surface that has been changed by the step of changing into data printable on the print surface before being changed by the step of changing.

8. The printing method according to claim 7, wherein the table is movable in the Y-axis direction and the Z-axis direction, and the print head is movable in the X-axis direction.

9. The printing method according to claim 7, wherein the table is movable in the Z-axis direction, and the print head is movable in the X-axis direction and the Y-axis direction.

10. The printing method according to claim 7, wherein the normalizing unit is configured to set a quadrilateral to an outline of the print surface in the image of the print surface of the print medium and to calculate an orientation of the print surface so as to change the orientation of the print surface to the given orientation.

11. The printing method according to claim 7, wherein the projecting unit is configured to project an 8-bit Gray code pattern.

* * * * *